United States Patent
Adamson et al.

(10) Patent No.: US 12,509,401 B2
(45) Date of Patent: Dec. 30, 2025

(54) CERAMIC FOAMS WITH IMBEDDED SELF-ASSEMBLED ELECTRICALLY CONDUCTIVE PRISTINE GRAPHENE NETWORKS

(71) Applicant: University of Connecticut, Farmington, CT (US)

(72) Inventors: Douglas H. Adamson, Mansfield Center, CT (US); Garrett Kraft, Cottonwood Heights, UT (US)

(73) Assignee: University of Connecticut, Farmington, CT (US)

( * ) Notice: Subject to any disclaimer, the term of this patent is extended or adjusted under 35 U.S.C. 154(b) by 1050 days.

(21) Appl. No.: 17/552,178

(22) Filed: Dec. 15, 2021

(65) Prior Publication Data

US 2022/0194858 A1 Jun. 23, 2022

Related U.S. Application Data

(60) Provisional application No. 63/127,013, filed on Dec. 17, 2020.

(51) Int. Cl.
| | | |
|---|---|---|
| *C01B 32/19* | (2017.01) | |
| *C04B 35/14* | (2006.01) | |
| *C04B 41/50* | (2006.01) | |
| *H01M 4/62* | (2006.01) | |
| *H01M 10/0525* | (2010.01) | |

(52) U.S. Cl.
CPC .............. *C04B 35/14* (2013.01); *C01B 32/19* (2017.08); *C04B 41/5001* (2013.01); *C01P 2004/20* (2013.01); *C01P 2004/61* (2013.01); *C04B 2235/422* (2013.01); *C04B 2235/5292* (2013.01); *H01M 4/625* (2013.01); *H01M 10/0525* (2013.01)

(58) Field of Classification Search
None
See application file for complete search history.

(56) References Cited

U.S. PATENT DOCUMENTS

| 9,646,735 B2 | 5/2017 | Adamson et al. |
| 9,666,861 B2 | 5/2017 | Hong et al. |
| (Continued) | | |

FOREIGN PATENT DOCUMENTS

| CN | 106268630 A | 1/2017 |
| CN | 107732187 A | 2/2018 |
| (Continued) | | |

OTHER PUBLICATIONS

Picot, O., Rocha, V., Ferraro, C. et al. Using graphene networks to build bioinspired self-monitoring ceramics. Nat Commun 8, 14425 (2017), pp. 1-11. (Year: 2017).*

(Continued)

*Primary Examiner* — Elizabeth Collister
(74) *Attorney, Agent, or Firm* — McCarter & English, LLP

(57) ABSTRACT

Porous, electrically conductive ceramic foams incorporating continuous self-assembled graphene networks are described. The disclosed approach uses interfacial trapping to spontaneously exfoliate and assemble pristine graphite, not graphite oxide, in a ceramic sol-gel. The composite foams display electrical conductivity and joule heating, with anticipated applications as, for example, catalyst supports, thermoelectrics, and porous electrodes.

17 Claims, 20 Drawing Sheets

(56) References Cited

U.S. PATENT DOCUMENTS

| | | |
|---|---|---|
| 10,221,294 B2 | 3/2019 | Nazarpour et al. |
| 2017/0096657 A1 | 4/2017 | Gosselin et al. |
| 2017/0216923 A1 | 8/2017 | Babenko et al. |
| 2017/0222212 A1 | 8/2017 | Hong et al. |

FOREIGN PATENT DOCUMENTS

| | | |
|---|---|---|
| CN | 109244412 A | 1/2019 |
| WO | WO2019070568 A2 | 4/2019 |
| WO | WO2019027337 A1 | 7/2019 |

OTHER PUBLICATIONS

Leishan Shao, Jingjing Li, Yu Guang, Yuliang Zhang, Heng Zhang, Xinyuan Che, Yinghan Wang, PVA/polyethyleneimine-functionalized graphene composites with optimized properties, Materials & Design, vol. 99, 2016, pp. 235-242 (Year: 2016).*

Lee, et al., Measurement of the Elastic Properties and Intrinsic Strength of Monolayer Graphene, Science, vol. 321, Issue 5887, 2008, pp. 385-388.

Chatterjee, et al., Mechanical Reinforcement and Thermal Conductivity In Expanded Graphene Nanoplatelets Reinforced Epoxy Composites, Chemical Physics Letters, 531, 2012, pp. 6-10.

Woltornist, et al., Polymer/Pristine Graphene Based Composites: From Emulsions to Strong, Electrically Conducting Foams, Macromolecules, 48, 2015, pp. 687-693.

Woltornist, et al., Properties of Pristine Graphene Composites Arising from the Mechanism of Graphene- Stabilized Emulsion Formation, Industrial & Engineering Chemical Research, 55, 2016, pp. 6777-6782.

* cited by examiner

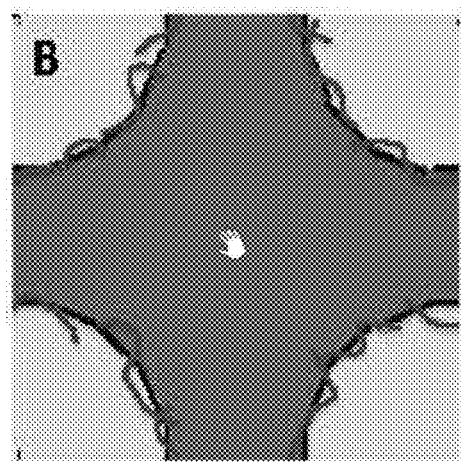  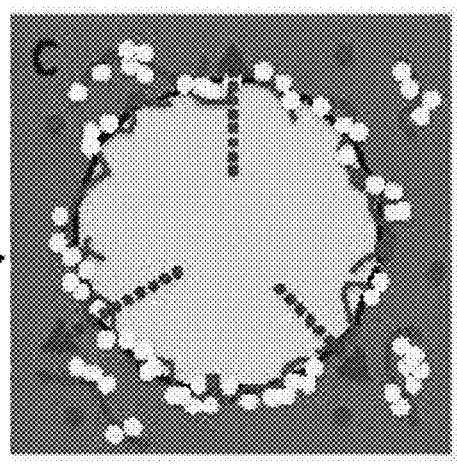
r Emulsions
FIGURE 2B
Composite Foams
FIGURE 2C
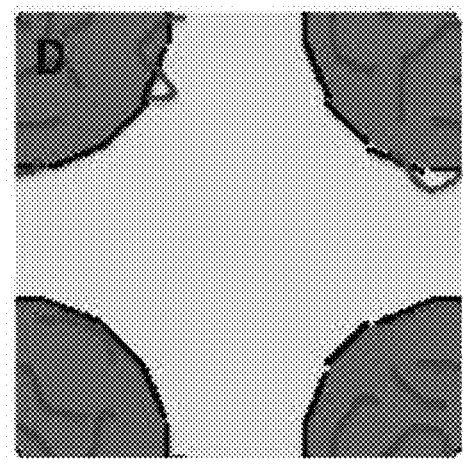  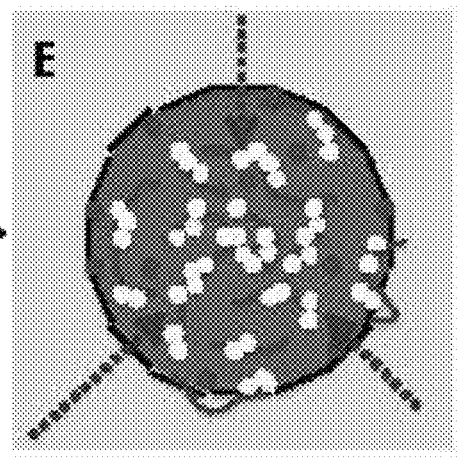
Water-in-Oil Emulsions
FIGURE 2D
Composite Microspheres
FIGURE 2E

CERAMIC FOAMS WITH IMBEDDED SELF-ASSEMBLED ELECTRICALLY CONDUCTIVE PRISTINE GRAPHENE NETWORKS

CROSS-REFERENCE TO RELATED APPLICATION

The present application claims priority benefit to a provisional application entitled "Ceramic Foams with Imbedded Self-Assembled Electrically Conductive Pristine Graphene Networks," which was filed on Dec. 17, 2020, and assigned Ser. No. 63/127,013. The entire content of the foregoing provisional application is incorporated herein by reference.

STATEMENT OF GOVERNMENT FUNDING

This invention was made with government support under DMREF-1535412 awarded by National Science Foundation Division of Materials Research (DMREF program). The government has certain rights in the invention.

TECHNICAL FIELD

A serious challenge to creating composites with percolating fillers is the large fraction of filler required, often greater than 60% of the total mass, that severely compromises the mechanical properties of the composites. Decreasing that fraction while maintaining percolation requires controlled arrangement of the filler and, in the case of graphitic fillers, exfoliation of the graphite to graphene. According to the present disclosure, systems and methods for simultaneously achieving both goals in a ceramic matrix are provided.

In a first advantageous aspect of the present disclosure, a self-assembled, continuous, well-ordered graphene (not graphene oxide) scaffold is incorporated into a ceramic matrix. The graphene is exfoliated and assembled spontaneously using a thermodynamically driven approach.

In a second advantageous aspect of the present disclosure, phase inversion is used to synthesize a silica high internal phase emulsion (HIPE).

In a third advantageous aspect of the present disclosure, a hydrophilic polymer is used to both change the surface energy of graphene sheets and catalyze the condensation of a ceramic precursor at room temperature and neutral pH.

Pursuant to a convergence of the disclosed approaches, the present disclosure provides a material not otherwise possible and by a scalable and environmentally friendly mechanism. There is no oxidation or reduction of the graphite required and no high temperature treatment is necessary, making this new material, and its mechanism of formation, unique and highly advantageous.

BACKGROUND

The simplicity of self-assembly makes it an attractive approach for otherwise difficult or energy-intensive approaches to creating controlled structure and functionality. In the present disclosure, graphene sheets are used as two-dimensional surfactants to create porous ceramics, combining structural control with the functionality of graphene. The macroporous ceramic foams enabled by this approach find applications in the filtration of molten metals, catalyst supports, and exhaust gas filtration.[1-4]

Adding electrical functionality to these materials paves the way for a wide range of new applications, such as thermoelectrics, robust porous electrodes, and self-heating filters. However, imparting electrical conductivity normally requires the addition of a substantial amount of conductive filler in order to reach the percolation threshold, significantly impacting the mechanical properties of the ceramic. One approach to lower the percolation threshold is to assemble the conductive filler into an ordered network within the composite. The simplicity of self-assembly makes it an attractive approach for otherwise difficult or energy-intensive approaches to creating controlled structure and functionality in composite[5,6] materials.

Improving the electrical conductivity or mechanical properties of composites with the addition of graphene is a very active area of research. In a prior teaching (U.S. Pat. No. 9,646,735, the use of a biphasic system, oil and water, with graphene suspended at the interface, was disclosed and upon mixing, the system formed a water-in-oil emulsion containing a percolating network of graphene at the water/oil interface.

The source of graphene for use in graphene-based applications may vary. For example, graphene may be sourced from exfoliated graphite or produced from carbon[12,13] precursors. In the former case, the most popular method is first to oxidize the graphite followed by solution exfoliation and thermal or chemical reduction to reduced graphene oxide (rGO).[12-14] In the latter case, a large amount of energy is needed to heat the carbon precursor and convert it to graphene.[15]

In addition, cobalt oxide based materials are currently used for the cathode in lithium ion batteries. Cobalt suffers from resource scarcity, with most of the metal coming from the Dominican Republic and Congo where sourcing issues can arise. In response to the scarcity of cobalt, there has been a switch to other metal oxides, such as manganese and nickel. Silicon oxide based cathodes offer a unique, readily available material for the fast expanding lithium ion battery market.

Thus, despite efforts to date, a need remains to further benefit from and advance the promise of ceramic foams and methods for production thereof. These and other needs are satisfied by the systems and methods of the present disclosure.

SUMMARY

According to the present disclosure, systems and methods for making oil-in-water and water-in-oil emulsions with pristine graphene are disclosed. In addition, the disclosed templating technique can be advantageously combined with sol-gel chemistry to form conductive graphene coated spheres and conductive graphene templated foams. The disclosed systems and methods can be used, for example, to make conductive porous foams, i.e., a material of particular interest for lithium ion battery electrode materials.

In the industry, there has been increased interest shown in metal-oxide/graphite electrodes with promises of increased performance and readily available inert materials. The disclosed process is able to form porous conductive composites of silica/graphene that can be readily controlled and tuned to different design specifications. In addition, the porosity and hydrophilicity of the materials produced according to the present disclosure allow for potential applications, for example, as a filtering media, with potential sensing applications due to the conductivity of the percolating graphene network.

In the present disclosure, graphene stabilized emulsions are used to template the formation of macroporous ceramics while demonstrating structural control and electrical conductivity in the resulting composite foams. Using graphene sheets as two-dimensional surfactants to create porous ceramics combines structure control with the functionality of graphene, and the attraction of using graphene is clear: incredible thermal[7,8] electrical[9-11] and physical properties. We also demonstrate that resistive heating of the ceramics is possible due to the retention of foam morphology in the final material.

In the present disclosure, thermodynamically driven exfoliation and self-assembly of graphene is used to form a continuous network of graphene sheets without any sonication, ball milling, or oxidation of the pristine graphite starting material.[16] This method of graphite exfoliation, termed interfacial trapping, is driven by the high-energy interface of an oil/water system. Adding graphite to an oil/water mixture spontaneously exfoliates the graphite as the graphene sheets spread at the interface to reduce the free energy of the system.[16] Graphene thus acts as a surfactant and is trapped at the oil-water interface. Although graphene prefers to be stacked, spreading minimizes the overall system free energy as it stabilizes the high-energy oil-water interface.

In the disclosed materials, sol-gel chemistry[17] was used to form the ceramic in conjunction with the graphene stabilized emulsion template,[18,19] forming composite foams containing an ordered network of graphene. A polymeric catalyst was used to condense the ceramic sol-gel at room temperature and neutral pH.[20-22] Using this catalyzed sol-gel approach, a bicontinuous silica/graphene composite foam was formed. For a sol-gel reagent, tetraethylorthosilicate (TEOS), one of the most common silica precursors in the literature, was used. In the past, TEOS has often not been used with polymeric catalysts because of its resistance to hydrolysis[23] compared to other metal alkoxides. In fact, TEOS is very hydrophobic, and when mixed with water forms a two-phase system stable for weeks.[23-24]

The systems and methods of the present disclosure yield materials with improved properties. In particular, by controlling the placement of the graphitic material within a composite structure, conductivity can be achieved at lower weight loadings of graphite and higher compositions of silica. The porous nature of the templated material allows for high surface area to improve electrical properties. Further, the use of cheap and abundant materials is facilitated according to the present disclosure.

The disclosed process thus produces a product that is scalable, inexpensive, and reproducible, while maximizing properties that are, for example, important to the design of cathode materials for batteries. The disclosed process also allows a high level of tunability for material structure and properties. Additional features, benefits and applications of the disclosed systems, methods and materials will be apparent from the description which follows, particularly when read in conjunction with the appended figures.

BRIEF DESCRIPTION OF THE FIGURES

To assist those of skill in the art in making and using the systems and methods of the present disclosure, reference is made to the accompanying figures, wherein:

FIG. 2B schematically depicts oil-in water emulsions formed by prolonged or high shear mixing;

FIG. 2C schematically depicts solid silica/graphene foams following condensation of the silica precursor;

FIG. 2D schematically depicts water-in-oil emulsion formed by gentle mixing;

FIG. 2E schematically depicts individual graphene coated silica beads;

DESCRIPTION OF EXEMPLARY EMBODIMENTS AND RESULTS

Figure 1A:
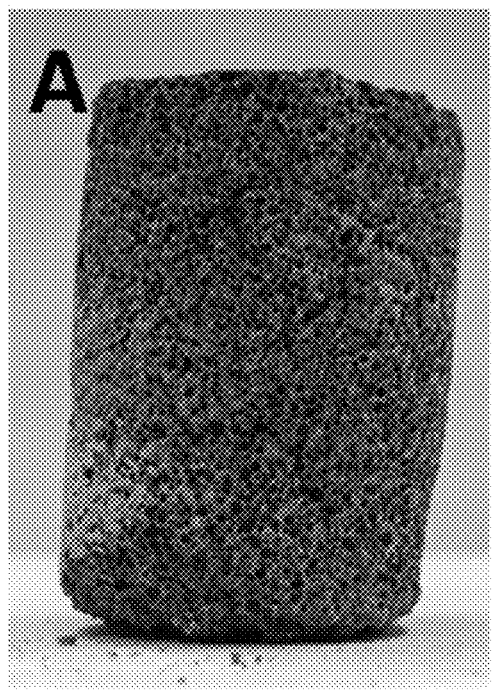
FIG. 1A is an image of a typical silica/graphene composite.

Conductive graphene/silica porous foam composites are made according to the present disclosure through a process that is versatile, adaptive and tunable depending on the desired properties of the final product. The systems/methods of the present disclosure may be employed where the biphasic system is any two insoluble liquids, including: oil/water or oil/oil biphasic systems. Oil/water systems are a preferred choice. Furthermore the solid suspended at the interface is not limited to graphene but may also include: graphite, graphene, graphite oxide, graphene oxide, reduced graphene oxide, surface modified graphene, surface modified graphene oxide, boron nitride, boron nitride oxide, metal flake, metal particles <100 μm, metal oxide particles <100 μm, functionalized or surface modified metal or metal oxide particles, and mixtures thereof. Other components that can be added to the system include: surfactants, interfacial stabilizing agents, solvents, catalysts, surface modifiers, crosslinking density modifiers, elastomeric spacers, porogens, and salts.

A specific example of surface modifiers for use according to the present disclosure involves the use of polyethyleneimine (PEI). By dissolving PEI in the aqueous phase of an oil/water system with graphene, an oil-in-water emulsion forms, the opposite of what would be formed without the PEI. In this example, the PEI acts as a surface modifier for the graphene, changing the surface hydrophilicity of the graphene sheets, and modifying the characteristics of the graphene to act more like a hydrophilic surfactant as opposed to a hydrophobic surfactant. Other modifiers may include materials that adsorb onto the graphene such as alkanes, poly(vinyl alcohol), poly(methyl methacrylate) (PMMA), and polyamines or other materials with aromatic substituents.

The suspended solid at the interface may be selected from a wide range of materials, with the defining characteristic being that the surface energy of the suspended material needs to be intermediate to that of the two insoluble liquid phases. The high-energy interface between the two insoluble liquids is stabilized by the presence of the suspended solid that acts as a transition layer between the two liquids and reduces the energy of the overall system. Specific materials that have been demonstrated in oil/water systems include: graphene/graphite, graphene oxide/graphite oxide, boron nitride, boron nitride oxide, and gold flake.

While previous work has focused on organic polymer based systems, the present disclosure extends beyond prior organic polymer systems to encompass, inter alia, a sol-gel mechanism to create inorganic conductive foams and graphene coated beads. The sol-gel precursor is generally a metal center with attached alkyl groups, alkoxide groups, or a mixture thereof. A specific example disclosed herein involves the use of tetraethylorthosilicate (TEOS), although the present disclosure is not limited by or to the use of TEOS or like materials.

Salts may be used according to the present disclosure to modify the interfacial energy of an aqueous phase, or as an intercalating ion. For example, the optional use of lithium salts to intercalate into the structure of the conductive composite and be reversibly removed through a lithiation/delithiation processes is specifically contemplated according to systems and methods of the present disclosure.

Surfactants and interfacial stabilizing agents are also optionally used to aide in formation and stability of the emulsion. Examples of surfactants that may be used include (but are not limited to): Span 80, CTAB, SDS, and pluronics (PPO-PEOPPO polymeric surfactant). An example of an interfacial stabilizing agent for use according to the present disclosure is polyvinyl alcohol.

Catalysts are generally required for the polymerization and or solidification of one or both phases. Catalysts can include free radical catalysts, metal catalysts, photocatalyst, mineral acids, mineral bases, Lewis acids, Lewis base, Bronsted-Lowery acids, or Bronsted-Lowery bases. Specific examples include a free radical catalyst, such as AIBN, a mineral acid, such as HCl, a mineral base, such as NaOH, or a strong neuclophile/Lewis base such as TEA or PEI.

One or more solvents can be mixed with the previously stated reagents to modify phase properties, increase solubility of reagents, adjust density of the final composite, or enhance processing.

Crosslinking density modifiers are molecules that may be added to the mixture to increase the average molecular weight between crosslinks and molecules that have a lower degree of functionality compared to the other polymerizable molecules within the system. An example of a crosslinking density modifier in a system where the main component is TEOS would be methyltriethoxysilane (MTES). TEOS has four hydrolysable groups which lead to four reactive sites from which to polymerize. MTES only has three hydrolysable groups and thus has a lower order of functionality. Another example would involve the addition of hydroxyl containing polymers, such as polyvinyl alcohol, dihydroxyl terminated polydimethylsiloxane, and/or dihydroxyl terminated polyethyleneoxide. These materials have dramatically different functionalities relative to their size compared to TEOS and can offer the added benefit of decreasing brittleness by acting as an elastomeric spacer within the composite material.

The synthesis of a typical composite according to the present disclosure utilizes an aqueous phase and an oil phase, e.g., at a ratio of 1:1. In an exemplary embodiment, the aqueous phase may consist of 10 wt % of PEI dissolved in deionized water. The oil phase may consist of TEOS. Pristine graphite may be added to the biphasic system, generally at a loading of between 0.1-20 wt %, but not to exceed 90 wt %. The system is mixed or agitated by hand shaking, mixing, or using an emulsifying blender for between 5 seconds and 1 hour, most preferably for 60 seconds. Depending on mixing length and energy, the system can form either a water-in-oil, or an oil-in-water emulsion. The composite generally solidifies after about 20 minutes, setting the morphology. The material is aged at room temperature for 24 hours and then put into an oven at 60° C. for 3-5 days. As the material ages, it shrinks as the sol-gel reaction moves to full conversion and the molecular byproducts are evaporated. The final product for an oil-in-water emulsion is a conductive foam, and for the water-in-oil emulsion, the final product takes the form of graphene coated spheres. The mechanism is further explained below. These materials are conductive, porous, and inorganic.

Of specific note according to the present disclosure is the fact that pristine graphene forms exclusively water-in-oil emulsions. In this system, PEI may be used as a catalyst for the sol-gel reaction and as a surface modifying agent for the graphene. The addition of PEI to the system and the adsorption of it onto the surface of the graphene cause the emulsion to undergo phase inversion and produce an oil-in-water emulsion. PEI has shown this behavior in other oil/water systems with different compositions. Conversely, an analogous system that substituted PEI for NaOH to catalyze the system would only make water-in-oil emulsions and synthesize graphene coated spheres. Similarly, PEI may be replaced with triethylamine and polyvinyl alcohol and, in such case, water-in-oil emulsions are generated, producing graphene coated microspheres. These systems demonstrate that PEI adsorbs onto the surface of graphene and changes its properties.

As noted above, the disclosed systems and methods are not limited to the use of TEOS, but can be advantageously employed with other sol-gel precursors, such as metal alkoxides. An exemplary metal alkoxide for use according to the present disclosure is titanium isopropoxide, in which case the system is the same as that described above except for the use of heptane and titanium isopropoxide as the organic phase. In such system, a porous foam was synthesized.

Figure 1B:
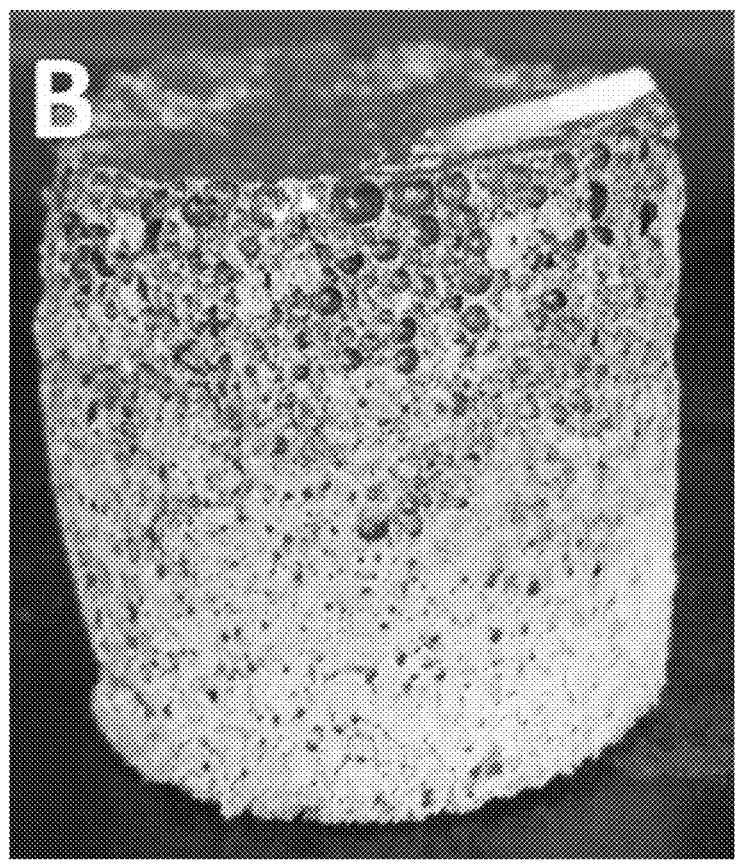
FIG. 1B is an image of a silica/graphene composite with blue hue.
Figure 1C:
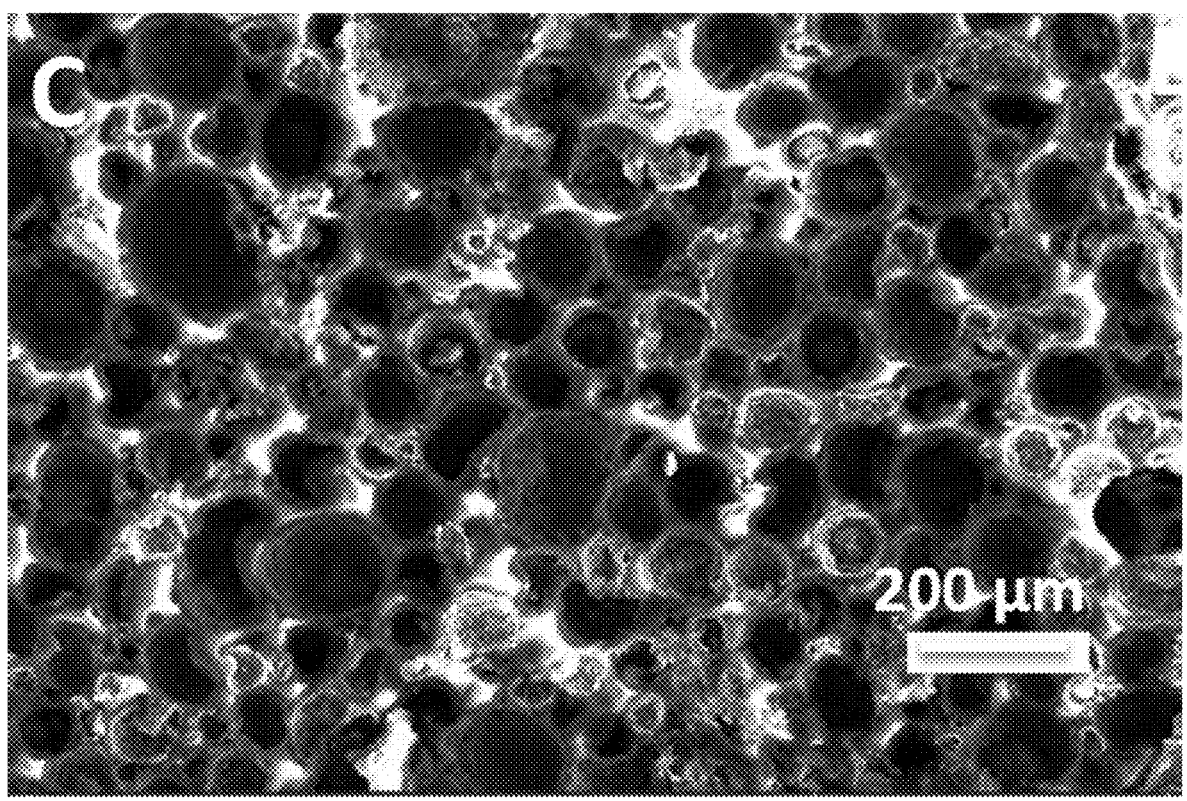
FIG. 1C is a close-up of the spheres showing the graphene lining at the interface.
Figure 2A:
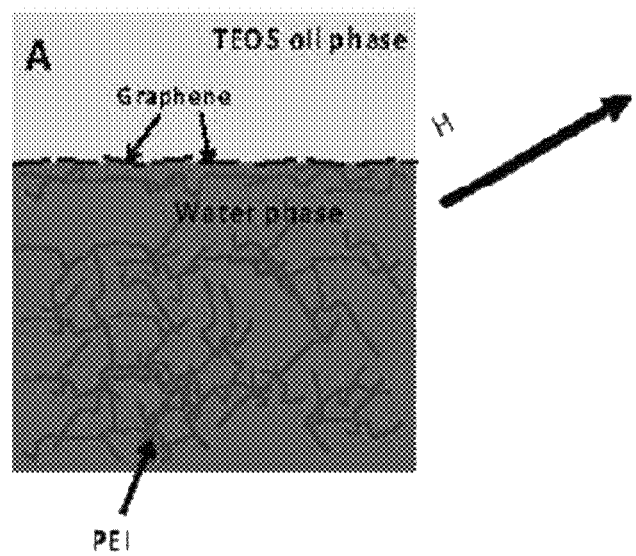
FIG. 2A schematically depicts the biphasic and aqueous PEI solution stabilized by overlapping graphene sheets.

Turning to the figures presented herein, shown in FIG. 1A is an electrically conductive silica/graphene composite foam synthesized in one step at room temperature. Stirring a mixture of natural flake graphite, TEOS, and an aqueous solution of poly(ethylene imine) (PEI) created an emulsion stabilized by graphene sheets at the TEOS/aqueous interface. The emulsion solidified in less than an hour, with no further production steps required. While the material was usually black, blue material, as shown in FIG. 1B, was also formed. The conductivity of the samples is a result of their internal structure: an open-cell foam with the cells lined by a thin layer of overlapping graphene sheets. These graphene sheets form a percolating network within the ceramic foam composite, resulting in electrical conductivity. This morphology is shown in FIG. 1C.

With reference to FIGS. 2A-2E, a sequence of processing steps for forming individual graphene-coated silica beads are schematically depicted.

Catalyzed by the cationic PEI dissolved in the aqueous phase at room temperature and neutral pH, the TEOS condensed to silica, forming a continuous silica phase in the interstitial region of the emulsion. Details of the experimental approach are described below in the Supporting Information portion of the disclosure. The mixture gelled after 20-30 minutes, locking in the graphene templated sphere morphology. The gel continued to harden as it dried, further curing and immobilizing the percolating network of graphene coated spheres.

Heptane/water graphene-stabilized emulsions are always water-in-oil. For the ceramic material, the type of emulsion formed depended on the extent of mixing. A schematic of the system is shown in FIG. 2. Due to the PEI from the aqueous phase adsorbing on the graphene surface, the hydrophobicity of the graphene sheets was altered. More energetic or prolonged stirring allowed more complete coverage of the graphene by PEI, creating more hydrophilic surfaces and thus oil-in-water emulsions. Low energy or short term stirring resulted in water-in-oil emulsions much like those observed in our previous work with organic polymer based composites.

Figure 5:
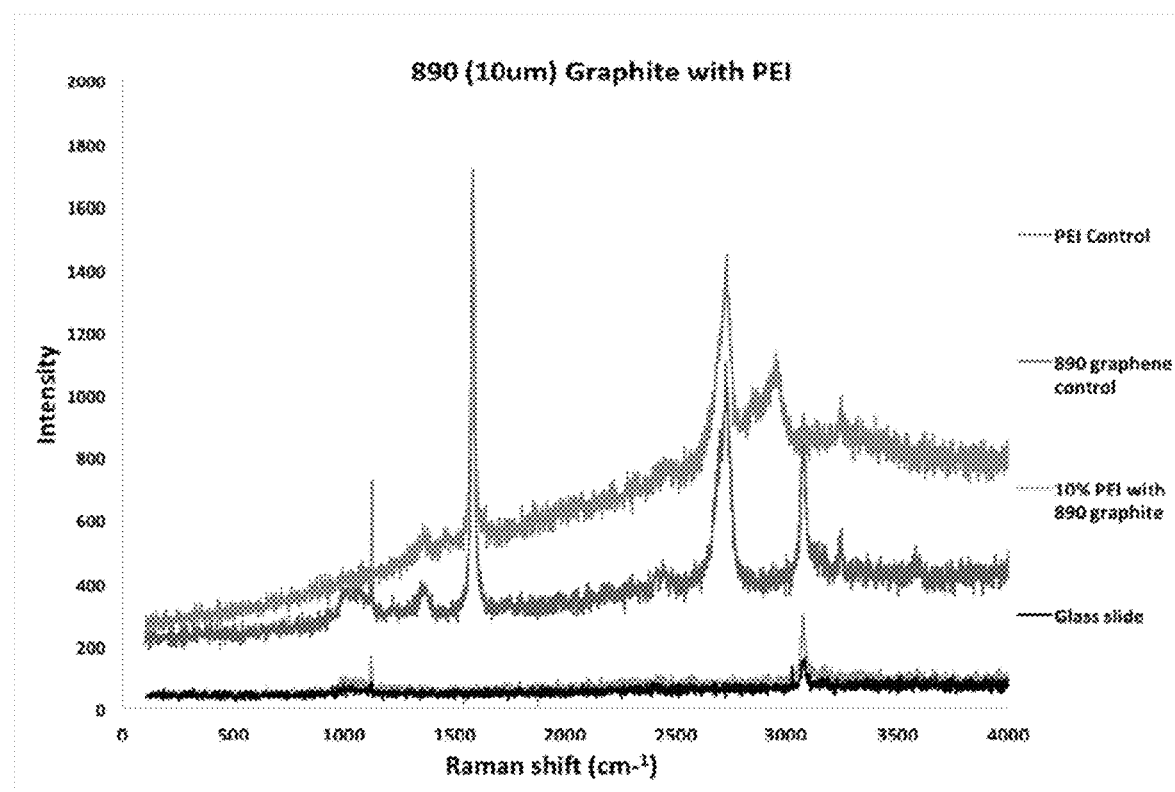
FIG. 5 is a plot of Raman spectroscopy data for TEOS/hexane emulsion with graphene.

Surprisingly the oil-in-water emulsions, with TEOS as the dispersed oil phase, resulted in solid foams, while the water-in-oil emulsions, with TEOS as the continuous oil phase, resulted in individual beads coated with graphene. This is outlined in FIG. 2. High energy or long duration mixing, shown in FIG. 2B, resulted in extensive coating of the graphene surface with PEI, causing it to be more hydrophilic and forming oil-in-water emulsions. Raman spectroscopy studies, shown in FIG. 5, demonstrated the propensity of PEI to adsorb to graphene surfaces, with the Raman 2D peak of graphene shifting from 3107 cm$^{-1}$ to 2966 cm$^{-1}$ in the presence of PEI. As the TEOS in the oil phase hydrolyzed, the more hydrophilic silanol molecules migrated out of the dispersed oil droplets and into the water phase as shown in FIG. 2C. As the concentration of hydrolyzed TEOS built up in the continuous aqueous phase, it condensed to form silica. Condensation was observed only in the aqueous interstitial region of the emulsion as a result of the low solubility of the hydrolyzed molecules in TEOS. With gentle hand shaking, the situation was reversed, as illustrated in FIG. 2D and FIG. 2E, and graphene coated silica beads were formed.

Figure 6A:
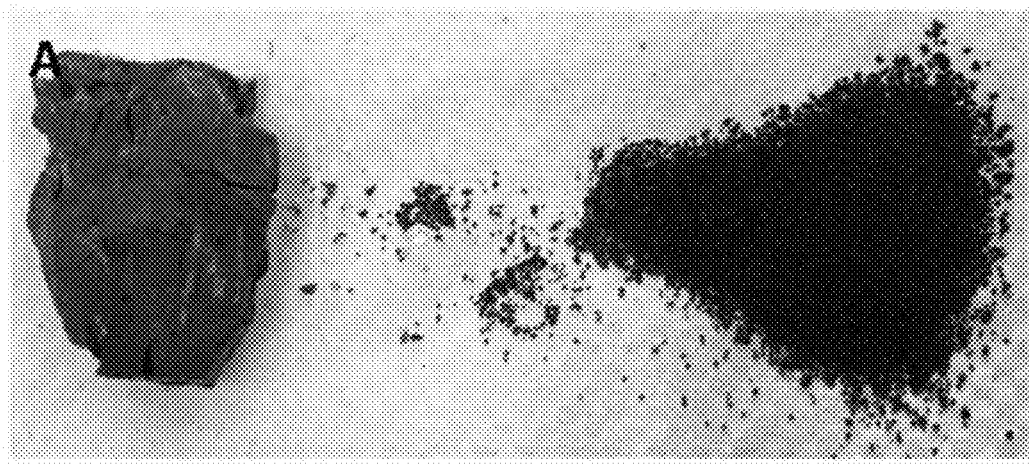
FIG. 6A is an image of 3D foam composite and microspheres.
Figure 6B:
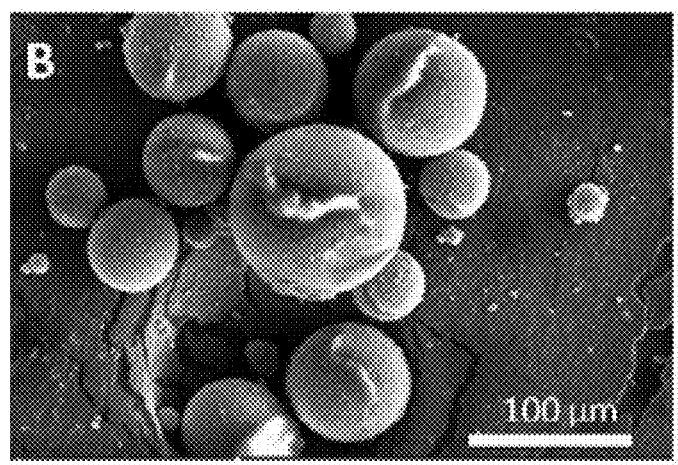
FIG. 6B is an SEM image of graphene coated silica microspheres.
Figure 6C:
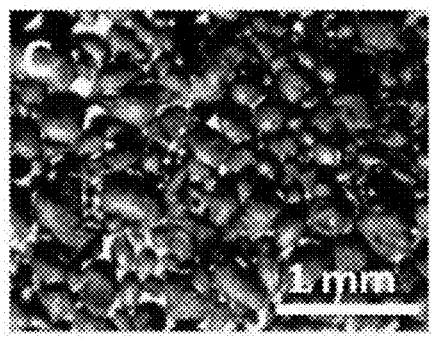
FIGS. 6C-6F are images of flake graphite samples at different PEI ratios.
Figure 6D:
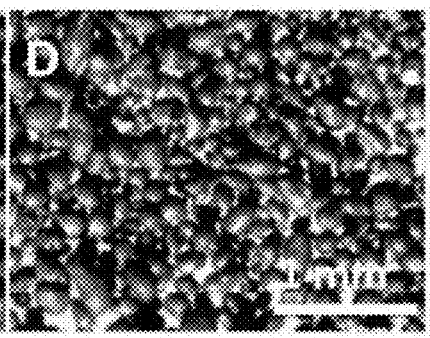
Figure 6E:
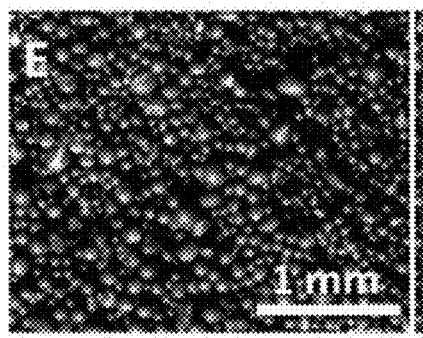
Figure 6F:
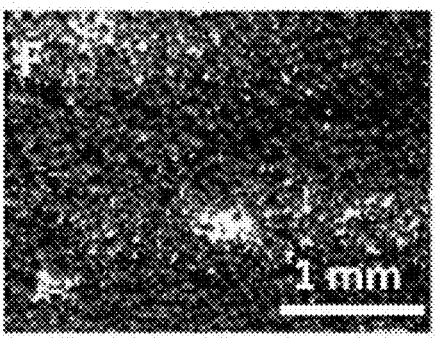
Figure 7A:
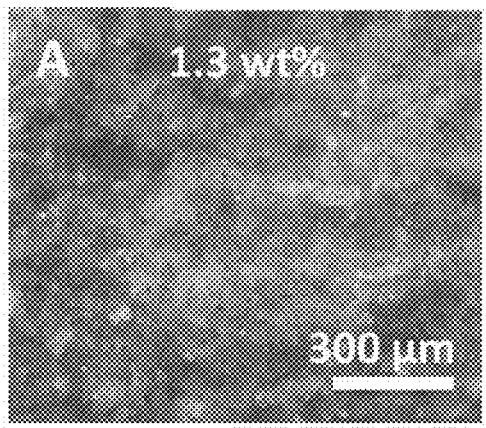
FIGS. 7A-7E provide optical microscopy images of foams made with increasing loadings of graphite for 10 μm graphite flake samples. The images correspond to FIG. 3B.
Figure 7B:
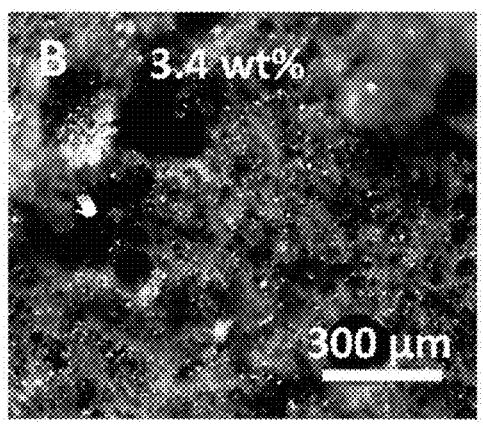
Figure 7C:
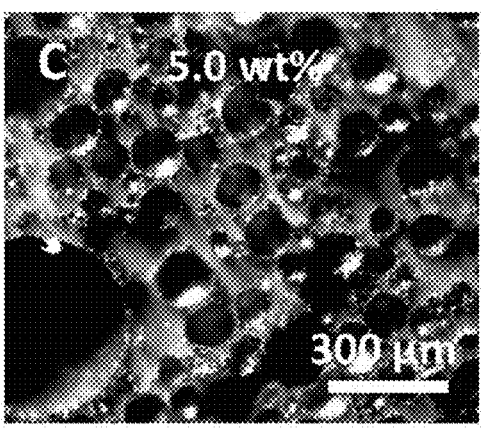
Figure 7D:
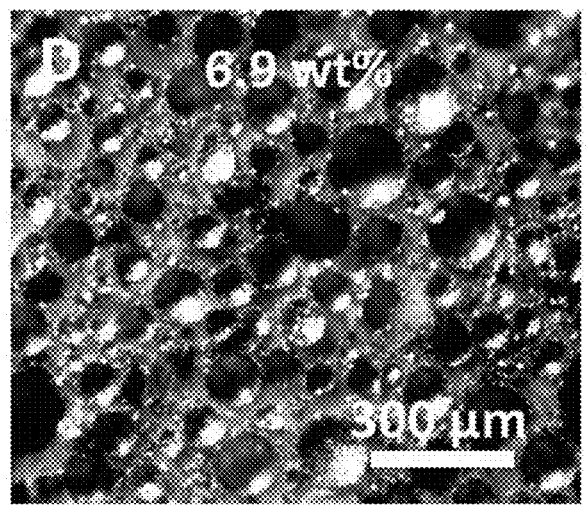
Figure 7E:
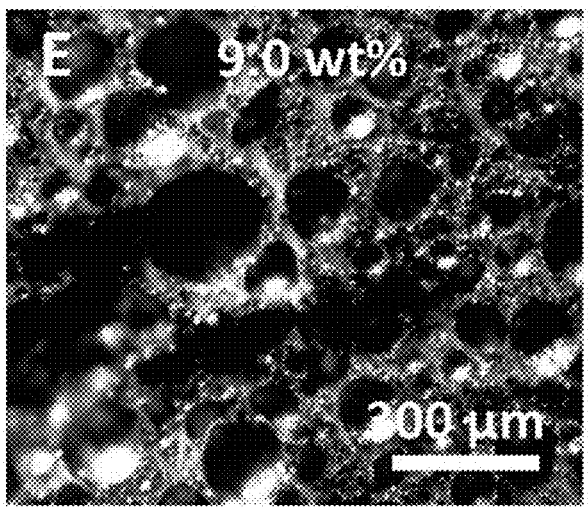

These beads are shown in FIGS. 6A-6F. Although made with the same formulation, the 3D foam composite on the left of FIG. 6A was formed by high energy mixing, while the microspheres on the right of FIG. 6B were formed by low energy mixing. FIG. 6B provides an SEM image of graphene-coated silica microspheres. FIG. 6C provides a series of images of 4.4 mg/mL, 1 μm flake graphite samples made with TEOS/10% aqueous PEI ratios of 50/50 (FIG. 6C), 60/40 (FIG. 6D), 70/30 (FIG. 6E), and 80/20 (FIG. 6F).

Figure 3A:
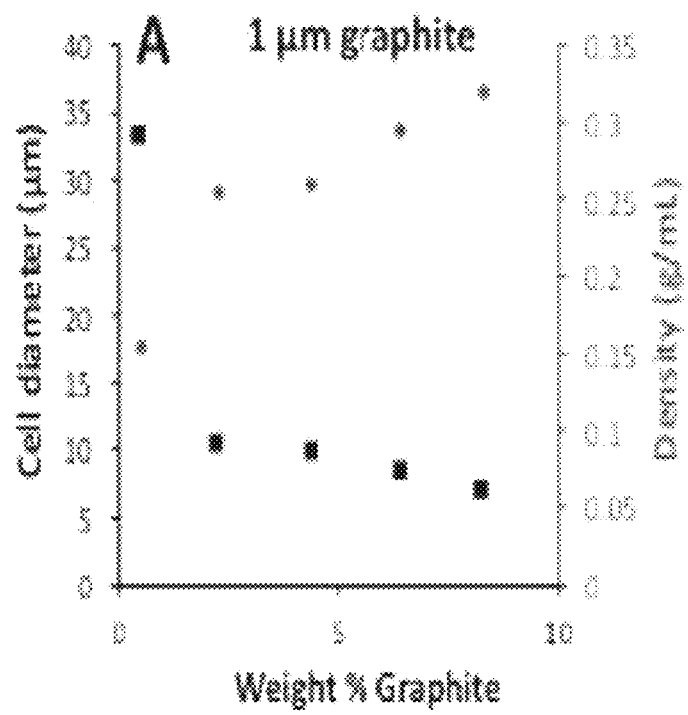
FIGS. 3A-3C are graphs showing sphere size dependence on graphite concentration for 1 μm, 10 μm, and 50 μm flake sizes, respectively.

Changing the loading or flake size of the graphite resulted in solid foam composites with varying densities and cell sizes. In all cases, the graphite used was flake graphite without any pretreatment. FIG. 3A shows that increasing the amount of 1 μm flake size graphite decreased the diameter of the foam cells from 33 μm at 0.45 wt % graphite, to 10 μm at 2.2 wt % graphite, with weight % graphite referring to the weight of graphite relative to the weight of the TEOS. This effect of graphite loading on cell size was a result of more graphene surfactant being available to stabilize more interface, decreasing the size of the dispersed phase droplets as the total interface of the system increased.[18] The stiffness of the graphene sheets limited how small the dispersed phase droplets could be,[24] and so the size of the cells did not get smaller than approximately 10 μm.

Figure 3B:
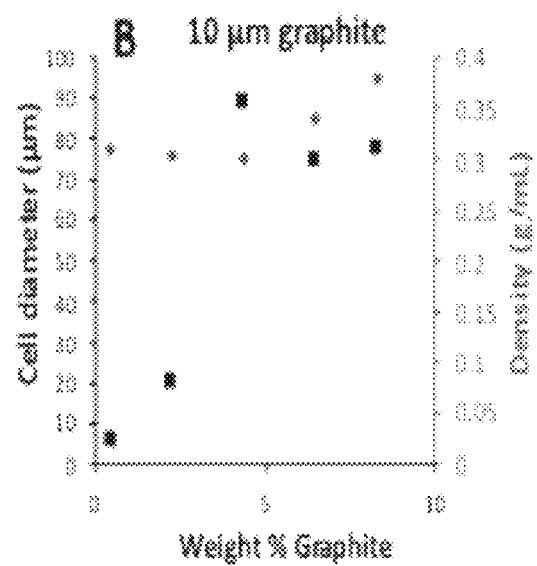
Figure 3C:
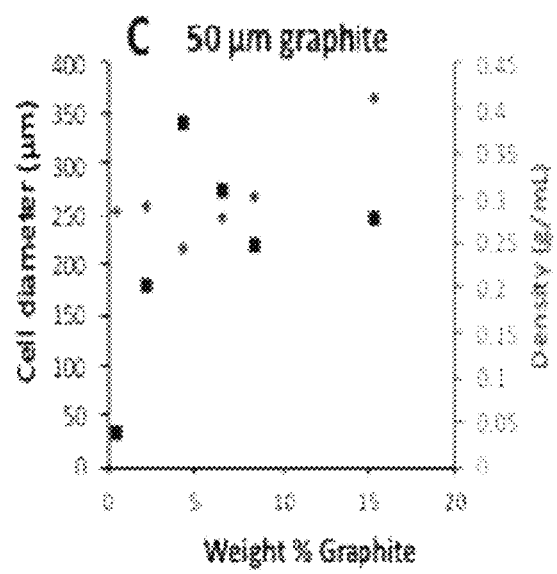
Figure 3D:
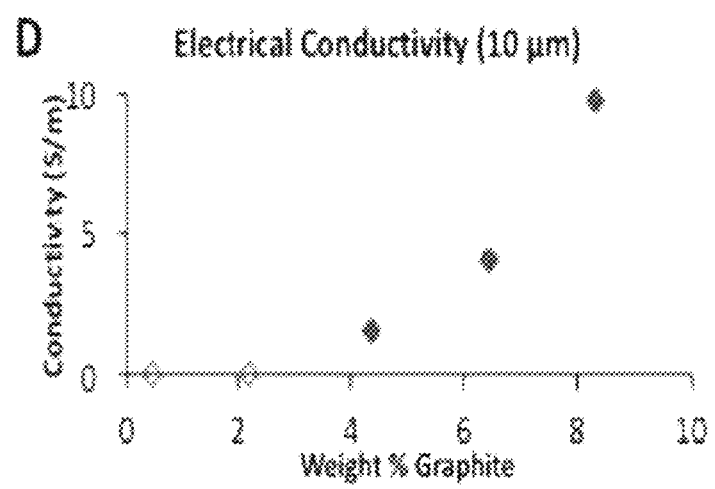
FIGS. 3D and 3E are graphs showing electrical conductivity with different size graphite flakes.
Figure 3E:
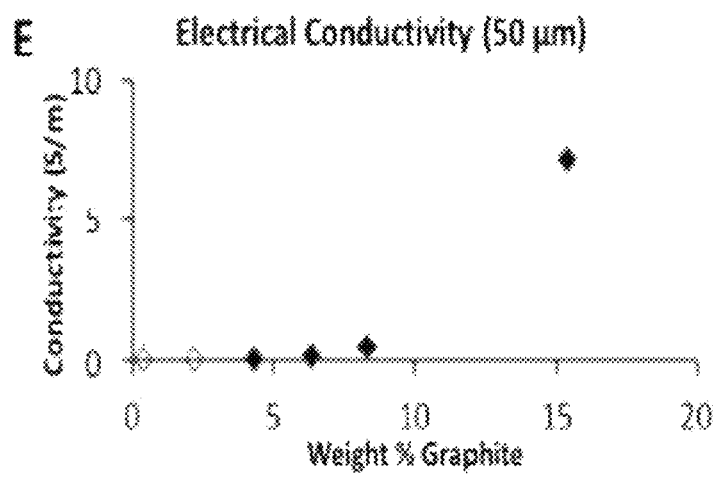
Figure 3F:
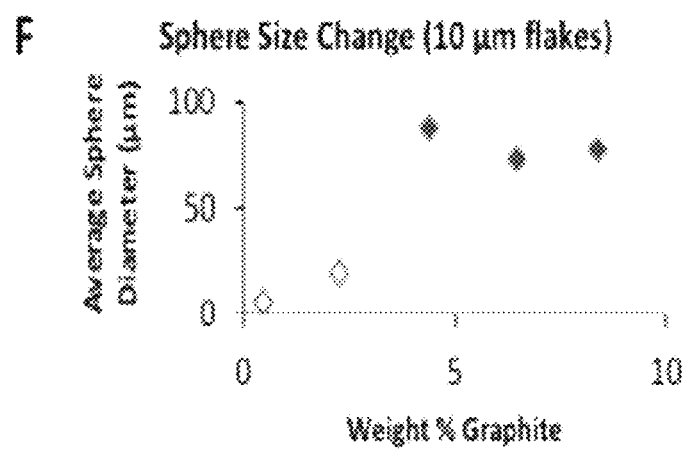
FIGS. 3F and 3G are graphs showing sphere size vs graphite loading for 10 μm and 50 μm graphite flake composites with hollow points being non-conductive composites and solid points being conductive composites.
Figure 3G:
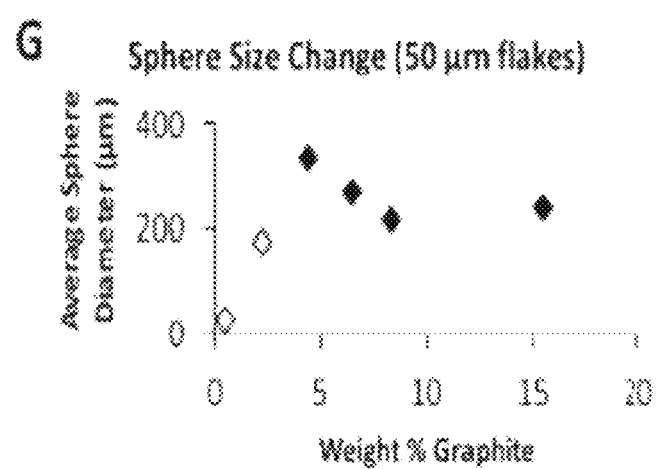

Unexpectedly, the 10 μm flake size graphite initially showed the opposite trend of sphere diameter with graphite concentration, starting at a 10 μm sphere diameter at 0.45 wt % graphite and increasing to 89 μm at 4.4 wt % graphite, before decreasing slightly to 75 μm (FIG. 3B). The 50 μm graphite started with sphere diameters of 33 μm at 0.45 wt % graphite, increased to 338 μm spheres at 4.4 wt % graphite, and then also decreased slightly to 250 μm (FIG. 3C). These cell diameter observations were mirrored by changes in composite density with increased graphite loading. The density of the composites made with 1 μm graphite increased with increasing loading of graphite over the entire range, as would be expected since the solid content of the foam increased for the same volume of foam. However, for both the 10 μm and 50 μm flake size graphite the density was steady at 0.3 g/mL until an inflection point at 4.4 wt %, followed by increasing density. The inflection point is at the same graphite concentration for both density and cell diameter. Above 4.4 wt %, both the 10 μm and 50 μm graphite behave as expected in terms of decreasing cell diameter and increasing density. FIGS. 3D and 3E provide graphs showing electrical conductivity with different size graphite flakes. FIGS. 3F and 3G provide graphs showing sphere size vs. graphite loading for 10 μm and 50 μm graphite flake composites with hollow points being non-conductive composites and solid points being conductive composites.

The SEM images in FIGS. 7A-7E suggest an explanation for the unexpected behavior of the larger graphite flake size foams at low graphite loadings. FIGS. 7A-7E provide optical microscopy images of foams made with increasing loads of graphite for 10 μm graphite flake samples—the images correspond to FIG. 3B. Between 3.4 and 5.0 wt %, the morphology of the composites showed a dramatic change. The foam morphology shown in FIG. 1 was not present initially for the larger graphite flakes. Thus the expected trends for cell diameter and density did not begin until the foam morphology appeared. In other words, there was no emulsion formed at lower loadings of the large flake size graphite. The reason lies with the kinetics of exfoliation. Larger flake graphite exfoliates much more slowly than does the smaller flake graphite, and thus does not have the needed surface area to stabilize an emulsion at low loadings. Smaller flake graphite exfoliates much more quickly, so even at low loadings it possesses the surface required to stabilize an emulsion. Thus at low graphite loadings, the larger flake graphite ceramic composites do not contain self-assembled networks of overlapping graphene sheets. Instead they are simply graphite mixed with the ceramic. This morphology is corroborated by electrical conductivity measurements of the composites shown in FIGS. 3D-3F.

Shown in FIGS. 3D-3F, the electrical conductivity of these materials corresponded to the cell size for the 10 μm and 50 µm graphite composites. The composites were not conductive until the foam morphology appeared. The 10 µm graphite-based foam had a conductivity of 1.55 S/m at a loading of 4.4 wt % graphite, and the 50 µm graphite had a conductivity of 0.10 S/m at 4.4 wt % graphite. In both cases, the conductivity abruptly appeared at the same graphite loading that the largest sphere diameter was obtained. Increasing the loading of graphite past that point produced ceramic composites with conductivities up to 9.8 S/m at 8.8 wt % loading for the 10 µm graphite and 7.2 S/m at 15.4 wt % for the 50 µm graphite.

The foam made with 1 µm graphite did not show electrical conductivity at any graphite loading. The image shown in FIG. 1C suggests a reason for the lack of conductivity in the composites made with 1 µm flake size graphite. The graphene-lined spheres in the composites were separated by several microns by interstitial silica. Although the separation distance is only a few microns, this is likely too far to be spanned by a graphite flake of 1 µm size, but not too far to be spanned by flakes with 10 to 50 µm lateral dimensions.

Figure 4A:
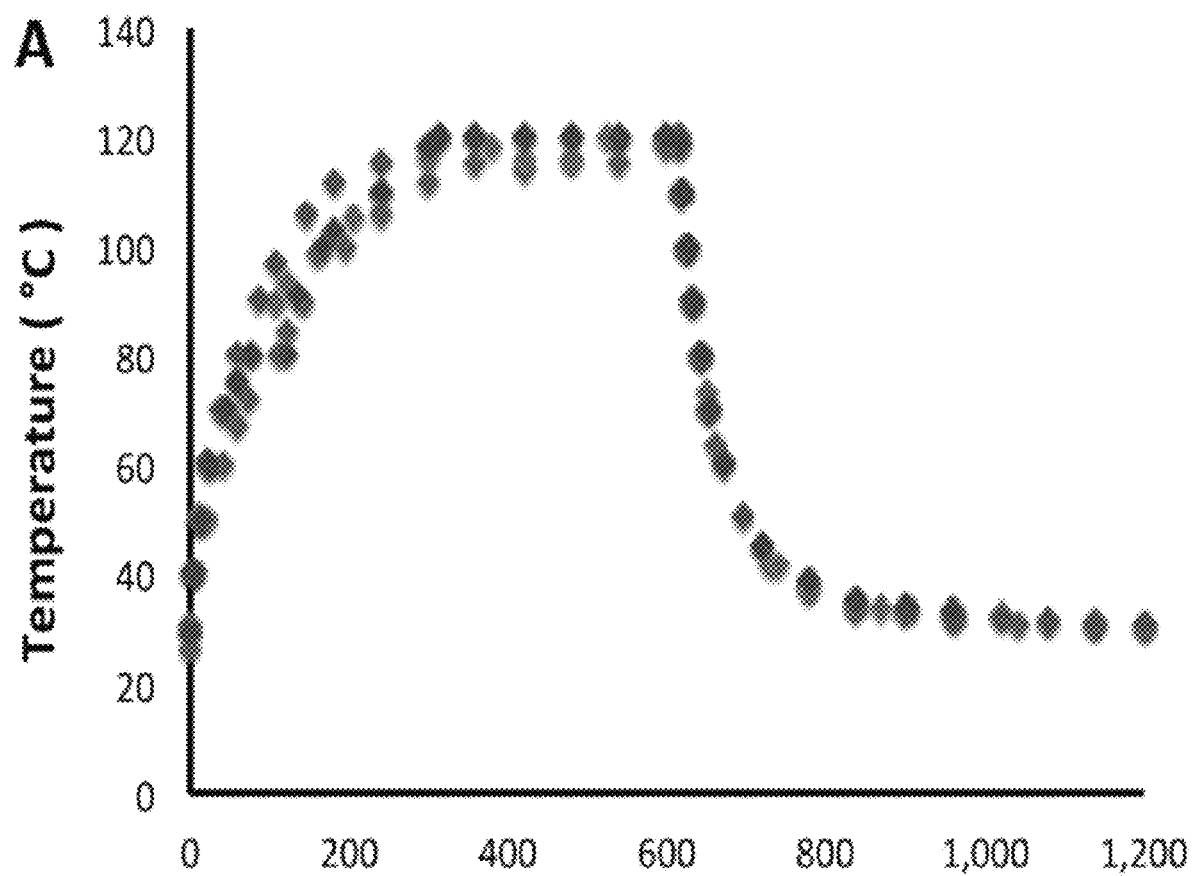
FIG. 4A is a temperature vs. time plot of a composite undergoing Joye heating.
Figure 4B:
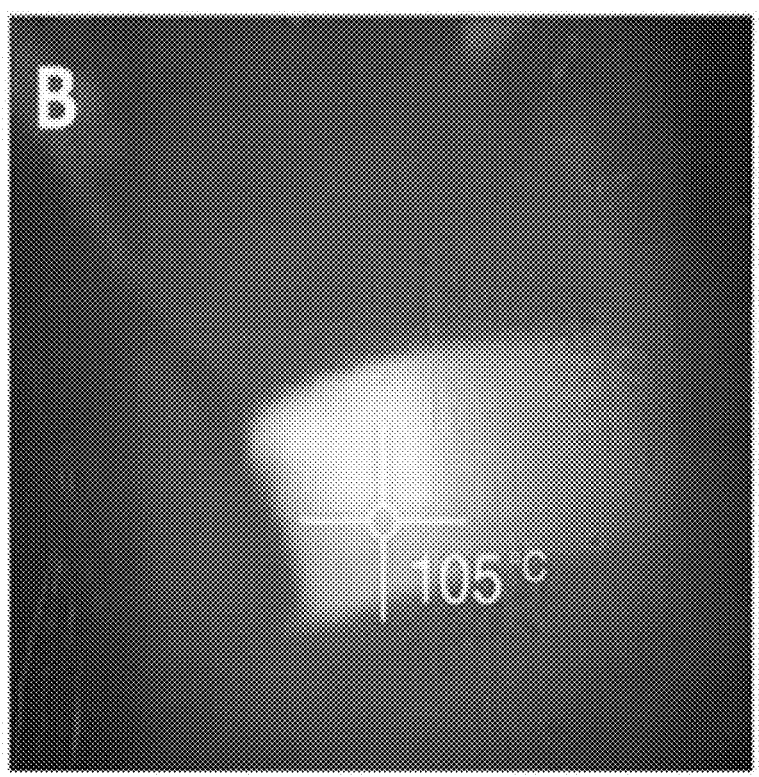
FIG. 4B is a thermal image of the composite of FIG. 4A during Joule heating.
Figure 8:
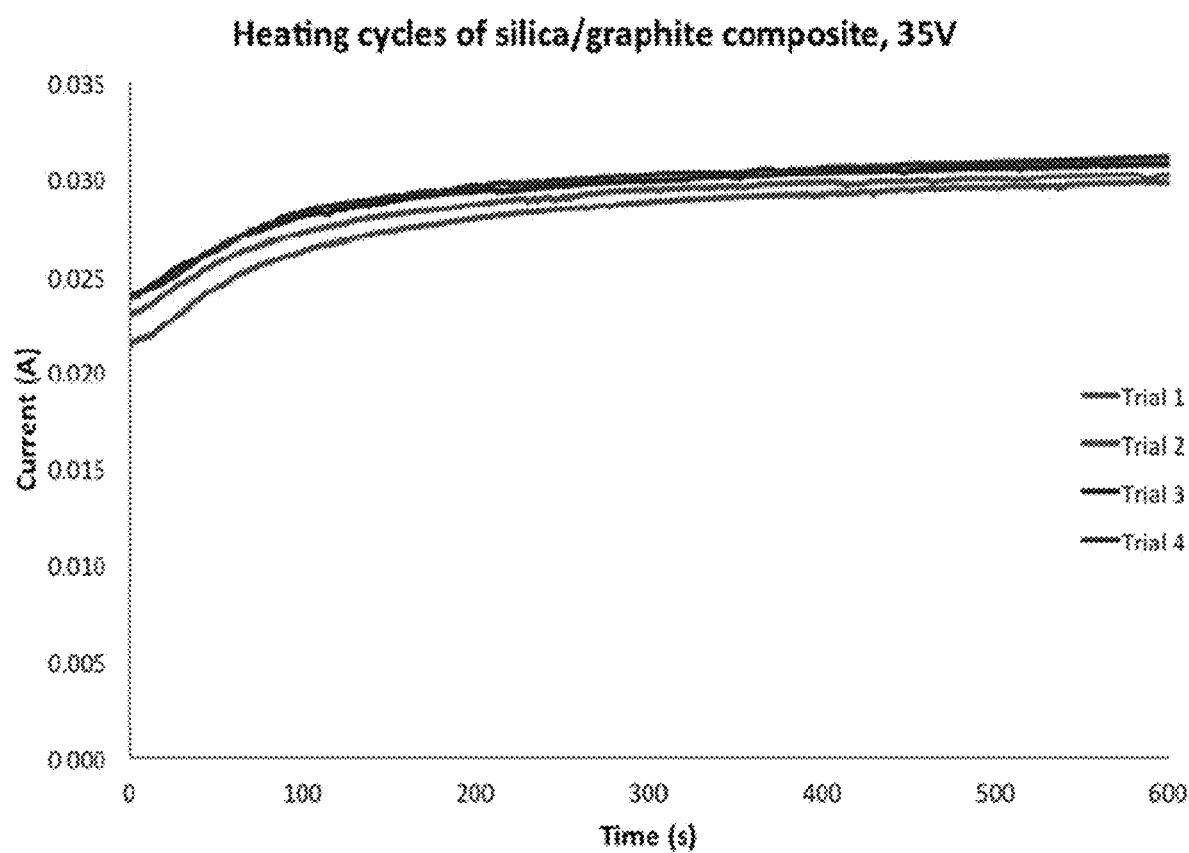
FIG. 8 is a plot of current profiles of silica/graphene foam composite Joule heating trials.

The graphene network incorporated into the ceramic foam not only templates the ceramic but also allows for joule heating of the composite, as demonstrated in FIG. 4A. By applying a potential of 35 volts to the composite for 600 seconds, the material was observed to increase in temperature up to 120° C. Upon removal of the potential, the material rapidly cooled to ambient temperature. This heating and cooling process was reproducible across multiple trials, with no indication of hysteresis. FIG. 8 shows the current profiles of the silica/graphene foam composite (Joule heating trials) across multiple trials with similar trends. As seen in the thermal image in FIG. 4B, the heating is evenly distributed across the sample. With the two components of the composite being graphene and silica, the temperature range of the material is limited only by the possible air oxidation of graphene.

Figure 4C:
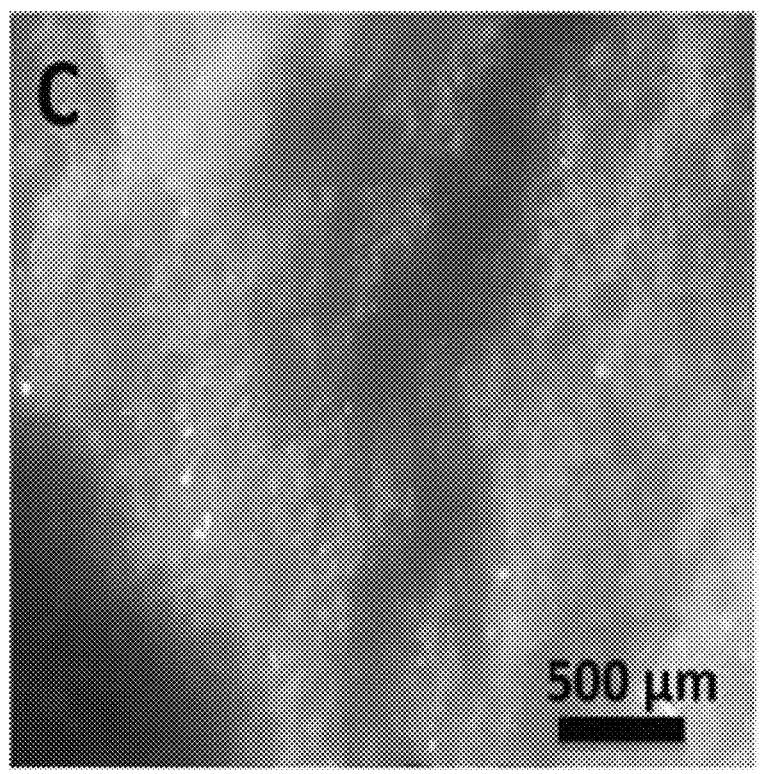
FIG. 4C is an image of a porous foam composite after sintering.
Figure 9A:
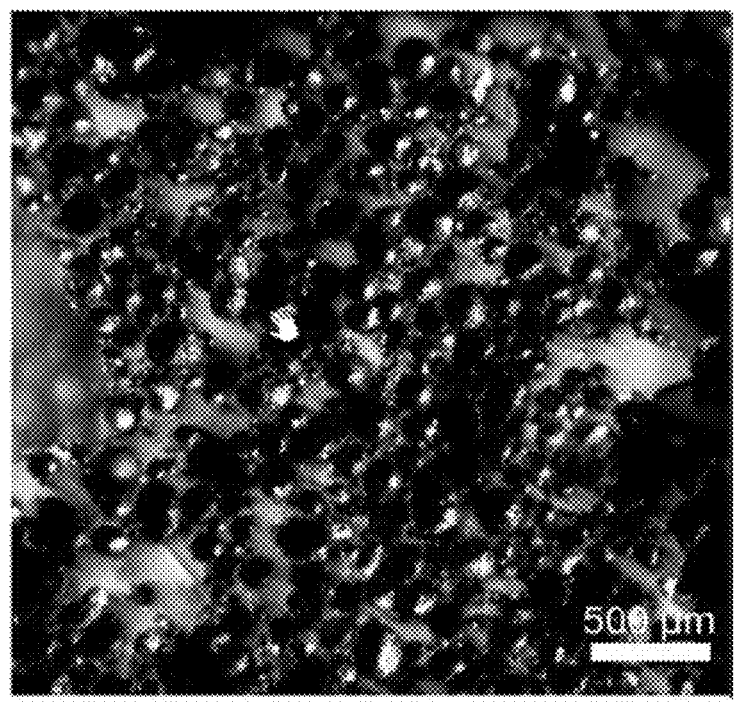
FIGS. 9A-9C provide optical microscopy images before and after sintering at 1275° C. for four (4) hours and XRD data showing a broad peak for the amorphous silica and a sharp peak for the graphite before sintering, and a single sharp peak for the cristobalite crystal phase silica after sintering.
Figure 9B:
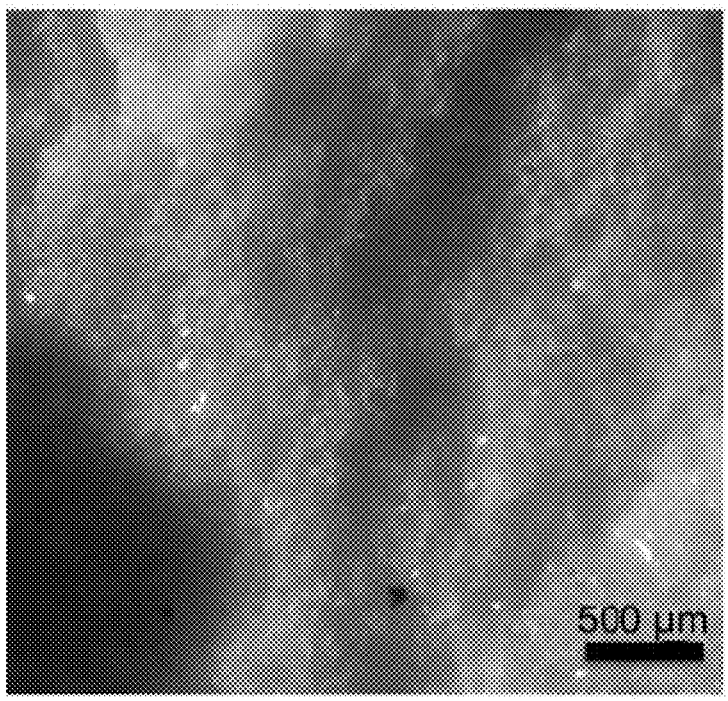
Figure 9C:
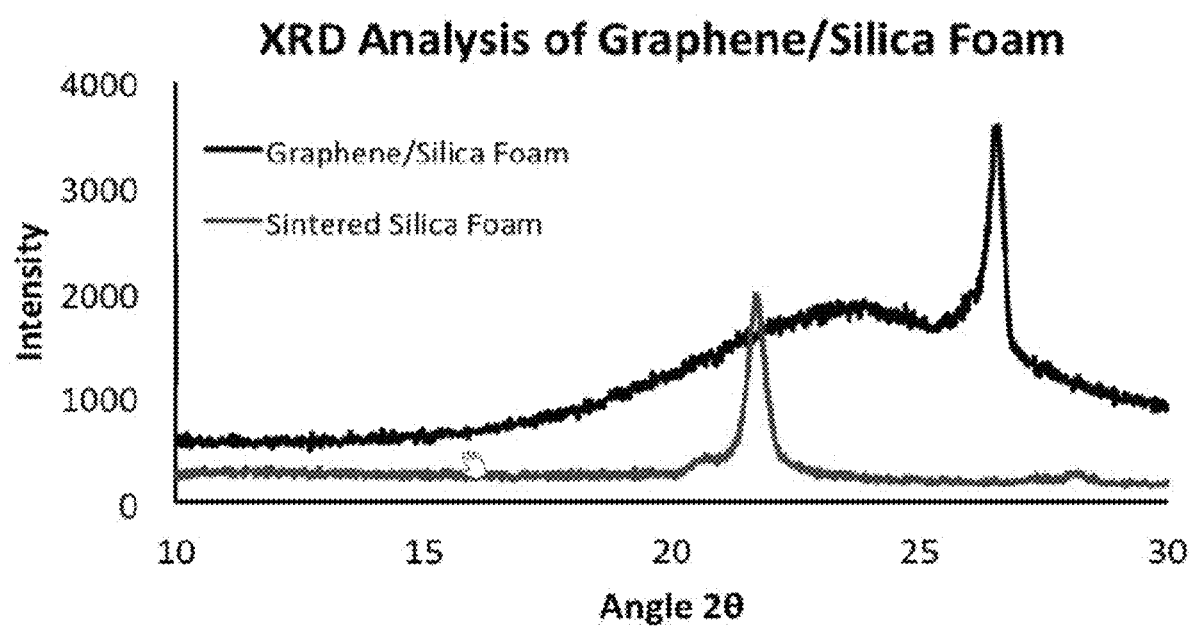

Of note, as many inorganic materials are sintered to crystallize the materials and increase strength, the continuous silica phase in a conductive composite was heated to 1275° C. FIGS. 9A and 9B provide optical microscopy images before and after sintering at 1275° C. for four hours. FIG. 9C provides an X-ray diffraction plot. As shown in FIG. 9C, the XRD trace of the composite showed a broad peak centered at 24°, associated with amorphous silica, and a sharp peak at 26.5°, indicative of graphite. After sintering, the broad amorphous silica peak and the sharp graphite peak disappeared, and only a sharp peak at 21.7° was visible, indicating the transition from amorphous to crystalline cristobalite silica. The optical microscopy image in FIG. 4C shows the composite after sintering. The sintering process decreases the sphere diameter from 130 µm to 78 µm, and the elevated temperature completely burns away the graphite leaving behind the templated spherical voids in a pure crystalline silica network.

Thus, according to the present disclosure, sol-gel chemistry was merged with graphene stabilized emulsions to advantageously form graphene templated ceramic foams and spheres at room temperature. According to the present disclosure, a conductive ceramic foam was synthesized by a simple, scalable process enabled by the thermodynamically driven self-assembly of pristine graphene. The foam is electrically conductive and displays joule heating with the application of current. In addition, tuning experimental parameters can control the density and cell size of the foam. As control of the size of the foam cells, pores, and morphology are important parameters for any application,[25] this aspect is expected to be critical in applications such as filtration, porous electrodes, and catalytic supports.

Description of Supporting Information/Examples

Sample Preparation: Synthesis of silica/graphene composites: For all composites, regardless of graphite type and concentration, branched PEI (26,000 g/mol, BASF) was dissolved in water (deionized) to make a 10% (wt/v) solution, and allowed to dissolve for at least one week before use. The aqueous PEI was added to make a 1/1 volume ratio of aqueous PEI/TEOS. An Erlenmeyer flask was charged with the necessary amount of graphite (Asbury Graphite Mills, Inc. grade Nano 24 lot #2148, grade Micro 890 lot #16787, or grade A90 lot #25750), 10 mL aqueous PEI, and 10 mL TEOS (Aldrich, 98%), and mixed with a Silverson laboratory mixer (Model L5M-A, Silverson Machines Inc.) for 30 seconds. The emulsion was transferred into a 20 mL vial and left uncapped to solidify at room temperature and ambient conditions. The composite was observed to gel after 20-30 minutes and become rigid with continued drying. Drying was conducted at room temperature and under ambient conditions and lasted from 3-7 days. The ceramic nanocomposites were then removed from the vial and allowed to dry for another 48 hrs to remove any remaining water. There was a slight variation in the sample preparation between a standard composite (1.3% graphite by weight) and the composites with higher graphite loadings due to an increase in the viscosity of the emulsions containing more graphite. The weight percent of graphite was calculated as the ratio of graphite to the total mass of the oil phase and graphite. For the 3.4 and 6.9 wt % graphene-stabilized emulsions, however, the Silverson mixer was not used, and the dispersion was instead hand shaken for 1 min. The calculated 14 wt % was also not blended using the Silverson mixer. After all reagents were added, the dispersion was hand shaken in 10 s intervals for 1 min. When changing graphite flake size, from the Nano 24 (1 µm) to the micro 890 (10 µm), samples were blended for 1 min with the Silverson mixer, then hand shaken for an additional 1 min.

Electrical Conductivity Measurements: Two rectangular prisms were cut (3 cm×1.5 cm×1 cm). The ends of the prisms were painted with Pelco colloidal silver paste (Ted Pella, Inc.) and allowed to dry overnight. Copper tape (Electron Microscopy Sciences) was then attached to the silver covered ends, and the current was measured using a Keithly Model 2420 sourcemeter. A voltage sweep from 0.001 to 0.1 V was performed with each sample using the sourcemeter, and the average resistance was obtained. The dimensions of the sample and the average resistance were used to calculate the conductivity.

Microscopic Characterization: Optical microscopy measurements were taken on fractured surfaces of composites with a Nikon Labophot with an IDS UI-3370 CP camera. SEM samples were prepared by breaking off small pieces from the composites. The pieces were placed on aluminum stubs covered with carbon tape to adhere the sample to the stub. The stubs were coated with Au/Pd in a sputter coater (Polaron Unit E5100) and characterized with a JEOL JSM-6335F FESEM using a 10 kV accelerating voltage. The acquired images were analyzed with Image J analysis software to determine the average sphere size. To account for the spheres not being cut in the center when making samples for SEM, the average radius from Image J was multiplied by four and divided by $\pi$ to calculate the radius. This same method was used for all average sphere size calculations.

Thermogravametric Analysis: Approximately 20 mg of the composite was placed in a platinum pan and heated to 800° C. using a heating rate of 10° C. min$^{-1}$ in a TA Instruments TGA Q-500 under nitrogen. The percent residue was analyzed at 795° C. for each sample to ensure no polymer remained.

Thermal Imaging: Rectangular prisms were used to study the resistive heating of the composites. After attaching copper tape to the silver-coated ends of the composite, a Keithly Model 2420 sourcemeter was used to test the material, and a thermal imaging camera (FLIR ONE) was used to study the temperature of the material while heating.

X-ray Diffraction (XRD): A Brucker D2 Phaser was used to record the XRD patterns of the ceramics. Graphite monochromatic copper radiation (Cu Kα) was operated at 40 kV and 40 mA. A 2θ range of 10° to 30° was scanned at the rate of 2°/min. To investigate the effects of temperature on crystallinity, the ceramic samples were heated to 1275° C. for 4 h and then cooled in a closed container. This was followed by XRD measurements.

Raman Spectroscopy: To characterize the adsorption of PEI onto the surface of the graphene Raman spectroscopy was done of a graphene film made by forming a PEI/heptane/graphene emulsion, drop casting the film onto a glass slide and allowing the emulsion to air dry, forming the film. Controls were taken of the same emulsion without PEI (water/heptane/graphene emulsion), drop cast and dried PEI, and the glass slide itself. The addition of PEI to the emulsions caused a peak shift from 3107 $cm^{-1}$ to 2966 $cm^{-1}$. This peak shift, along with the observations of unique oil-in-water emulsions give evidence to PEI adsorbing onto the surface of the graphene and causing the shift from hydrophobic surfactant properties for pristine graphene to hydrophilic surfactant properties for the PEI coated graphene.

Discussion of the Effect of Varying the Ratio of Oil to Water

Several factors affected the ability to produce microspheres. Graphite flake size and oil/water ratio directly impacted the ability to form the microspheres. The 1 μm graphite flake size stabilized the inverse emulsion best, followed by the 10 μm flake size, but the 50 μm flake size was not able to stabilize the metastable emulsion and unable to form the microspheres. The oil ratio also had a significant impact on sphere morphology. Microsphere-forming emulsions were observed only at an oil fraction of 50% or more by volume. As the oil fraction increases the spheres become smaller and more spherical. Spheres did not form much below 50% TEOS. Emulsions destabilization would happen at oil fractions close to 50%.

One of the unique properties of TEOS is how stable it is when exposed to water. Most metal alkoxides are highly reactive and upon exposure to water quickly hydrolyze and condense as an inorganic powder within seconds. TEOS, on the other hand, forms a two-phase system when added to water, the hydrophobic TEOS on top, and the water layer on the bottom. This system can remain stable for weeks before it eventually hydrolyzes, becoming a single phase, and condenses turning that single phase into a gel that dries and hardens into a ceramic.

Discussion of Other Sol-gel Catalysts

In addition to PEI, other water-soluble polymers were investigated. These included: poly(vinyl alcohol) (PVA), poly(ethylene oxide), and poly(acrylic acid). All formed water-in-oil emulsions typical for graphene-stabilized emulsions, but none produced solid ceramic foams. Other commonly used catalysts for sol-gel chemistry, such as HCl, NaOH, and triethylamine (TEA), were investigated to more fully understand the role of the PEI used in our system. All three catalysts were able to facilitate the sol-gel reaction of TEOS to silica, but catalyzing the reaction and still maintaining the emulsion templated morphology proved to be a challenge. HCl, being an acid catalyst, promoted the hydrolysis reaction over the condensation reaction and resulted in the destabilization of the interface and the collapse of the emulsion. The base catalysts, NaOH and TEA, promoted the condensation reaction by condensing hydrolyzed species, and were able to condense the silica and maintain the emulsion templated structure. However, both basic catalysts only formed water-in-oil emulsions and thus only produced the graphenecoated microspheres, no matter the graphite, oil/water ratio, or emulsification method. Without the PEI coated graphene, the oil-in-water emulsions necessary for the formation of the silica foam did not form. Therefore, all of the solid foam materials incorporated PEI in the aqueous phase, while the type and concentration of graphite was varied.

As shown in FIG. 8, current profiles for the Joule heating experiments suggest no hysteresis of the material over the four trials conducted.

The result of sol-gel chemistry is the formation of an amorphous ceramic material. Most ceramics get their beneficial properties from a preferred crystal structure. However, graphene is only stable to −600° C. under nitrogen, lower than the crystallization temperatures for most inorganics made with sol-gel chemistry, and in this case, much lower than the crystallization temperature of silica. Sintering at 1275° C. to induce the crystallization of silica to the cristobalite crystal phase produced a foamed material that maintained the graphene spheres templated structure even after the graphene was burned out, albeit the spheres were observed to shrink in size after the sintering process. Optical microscopy and XRD analysis showed definitive proof of the material transitioning from a graphene containing amorphous material, to a crystalline graphene free material.

Although the systems, methods and materials of the present disclosure have been described with reference to exemplary embodiments/implementations thereof, the present disclosure is not limited by or to such exemplary embodiments/implementations. Rather, as will be readily apparent to persons of ordinary skill, the disclosed systems, methods and materials may be implemented in various forms and variations without departing from the spirit or scope of the present disclosure.

REFERENCES

1 A. R. Studart, U. T. Gonzenbach, E. Tervoort and L. J. Gauckler, *J. Am. Ceram. Soc.*, 2006, 89, 1771-1789.
2 R. J. Davis and Z. F. Liu, *Chem. Mater.*, 1997, 9, 2311-2324.
3 V. F. Stone and R. J. Davis, *Chem. Mater.*, 1998, 10, 1468-1474.
4 S. Mann, S. L. Burkett, S. A. Davis, C. E. Fowler, N. H. Mendelson, S. D. Sims, D. Walsh and N. T. Whilton, *Chem. Mater.*, 1997, 9, 2300-2310.
5 C. Lee, X. Wei, J. W. Kysar and J. Hone, *Science (80-.).*, 2008, 321, 385-388.
6 S. Chatterjee, J. W. Wang, W. S. Kuo, N. H. Tai, C. Salzmann, W. L. Li, R. Hollertz, F. A. Nüesch and B. T. T. Chu, *Chem. Phys. Lett.*, 2012, 531, 6-10.
7 A. A. Balandin, S. Ghosh, W. Bao, I. Calizo, D. Teweldebrhan, F. Miao and C. N. Lau, *Nano Lett.*, 2008, 8, 902-907.
8 A. A. Balandin, *Nat. Mater.*, 2011, 10, 569-581.
9 K. S. Novoselov, *Science (80-.).*, 2004, 306, 666-669.
10 A. H. Castro Neto, F. Guinea, N. M. R. Peres, K. S. Novoselov and A. K. Geim, *Rev. Mod. Phys.*, 2009, 81, 109-162.

11 A. K. Geim and K. S. Novoselov, *Nat. Mater.*, 2007, 6, 183-191.

12 S. Eigler, C. Dotzer and A. Hirsch, *Carbon N. Y,* 2012, 50, 3666-3673.

13 R. Rozada, J. I. Paredes, S. Villar-Rodil, A. Martinez-Alonso and J. M. D. Tascon, *Nano Res.,* 2013, 6, 216-233.

14 C. Gómez-Navarro, J. C. Meyer, R. S. Sundaram, A. Chuvilin, S. Kurasch, M. Burghard, K. Kern and U. Kaiser, *Nano Lett.,* 2010, 10, 1144-1148.

15 M. Zhou, T. Lin, F. Huang, Y. Zhong, Z. Wang, Y. Tang, H. Bi, D. Wan and J. Lin, *Adv. Funct. Mater.,* 2013, 23, 2263-2269.

16 S. J. Woltornist, A. J. Oyer, J. M. Y. Carrillo, A. V. Dobrynin and D. H. Adamson, *ACS Nano,* 2013, 7, 7062-7066.

17 J. Brinker and G. W. Scherer, *Sol-gel science, the physics and chemistry of sol-gel processing,* Boston: Academic Press, 1990.

18 S. J. Woltornist and D. H. Adamson, *Ind. Eng. Chem. Res.,* 2016, 55, 6777-6782.

19 S. J. Woltornist, J. M. Y. Carrillo, T. O. Xu, A. V. Dobrynin and D. H. Adamson, *Macromolecules,* 2015, 48, 687-693.

20 V. Maneeratana, D. Portehault, J. Chaste, D. Mailly, M. Antonietti and C. Sanchez, *Adv. Mater.,* 2014, 26, 2654-2658.

21 J. Y. Shen, Y. N. Wu, B. R. Zhang and F. T. Li, *Rsc Adv.,* 2014, 4, 12805-12808.

22 H.-S. Wang, G.-D. Fu and X.-S. Li, *Recent Pat. Nanotechnol.,* 2009, 3, 21-31.

23 S. Pandey and S. B. Mishra, *J. Sol-Gel Sci. Technol.,* 2011, 59, 73-94.

24 C. C. Hire, A. J. Oyer, G. E. Macek, J. L. Bento and D. H. Adamson, *J. Mater. Chem. B,* 2013, 1, 1977-1984.

25 Y. Hotta, P. C. A. Alberius and L. Bergström, *J. Mater. Chem.,* 2003, 13, 496-501.

The invention claimed is:

1. A composite comprising:
   a. a ceramic matrix; and
   b. a self-assembled, continuous, well-ordered graphene scaffold incorporated into the ceramic matrix.

2. The composite of claim 1, wherein the graphene is exfoliated.

3. The composite of claim 1, wherein graphene associated with the graphene scaffold is incorporated into the ceramic matrix spontaneously using a thermodynamically driven approach.

4. A method for forming a conductive composite foam, comprising:

combining graphite, tetraethylorthosilicate (TEOS), and an aqueous solution of poly(ethylene imine) (PEI) to create an emulsion that is stabilized by graphene sheets formed at an interface between the TEOS and the PEI, and allowing the emulsion to solidify to define an open-cell foam, wherein the emulsion exhibits conductivity based on the open-cell foam with cells lined by a thin layer of overlapping graphene sheets.

5. The method of claim 4, wherein graphene associated with the graphene sheets function as two-dimensional surfactants.

6. The method of claim 4, further comprising including at least one of a surfactant, interfacial stabilizing agent, catalyst, surface modifier, crosslinking density modifier, elastomeric spacer, porogen and salt in the combining step.

7. The method of claim 4, wherein polyethyleneimine is used as a surface modifier in forming the composite open-cell foam.

8. The method of claim 4, wherein a surface modifier is used in forming the open-cell foam, and wherein the surface modifier is selected from the group consisting of an alkane, poly(vinyl alcohol), poly(methyl methacrylate), a polyamine and a material with an aromatic substituent.

9. The method of claim 4, wherein the TEOS forms condensed silica to define a continuous silica phase in an interstitial region of the emulsion.

10. The method of claim 4, wherein the emulsion functions to maintain a graphene-templated sphere morphology therewithin.

11. The method of claim 4, wherein a hydrophilic polymer is employed to change surface energy of the graphene sheets and to catalyze condensation of a ceramic precursor.

12. A device comprising a composite that includes:
   a. a ceramic matrix; and
   b. a self-assembled, continuous, well-ordered graphene scaffold incorporated into the ceramic matrix.

13. A device according to claim 12, wherein the device is a battery.

14. A device according to claim 12, wherein the device is a filter.

15. A device according to claim 12, wherein the device is a filtering media.

16. A device according to claim 15, wherein the filtering media includes one or more sensing applications.

17. A device according to claim 12, wherein the device is a thermoelectric device.

* * * * *